Nov. 10, 1953  A. A. ASHTON  2,658,589
AIR BRAKE FOR DRAWWORKS
Filed April 7, 1950  3 Sheets-Sheet 2
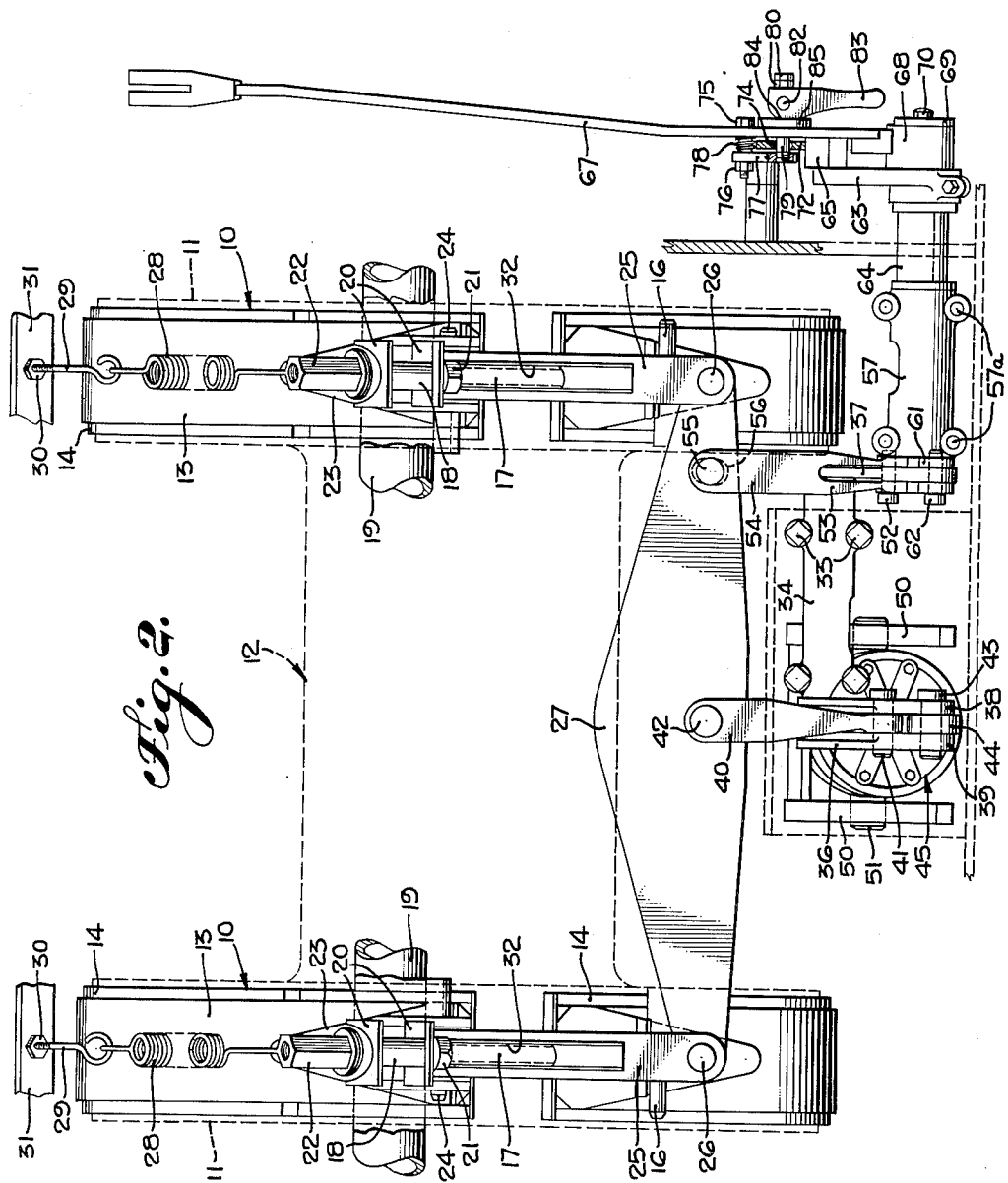
Fig. 2.
INVENTOR.
ALBERT A. ASHTON
BY
ATTORNEY

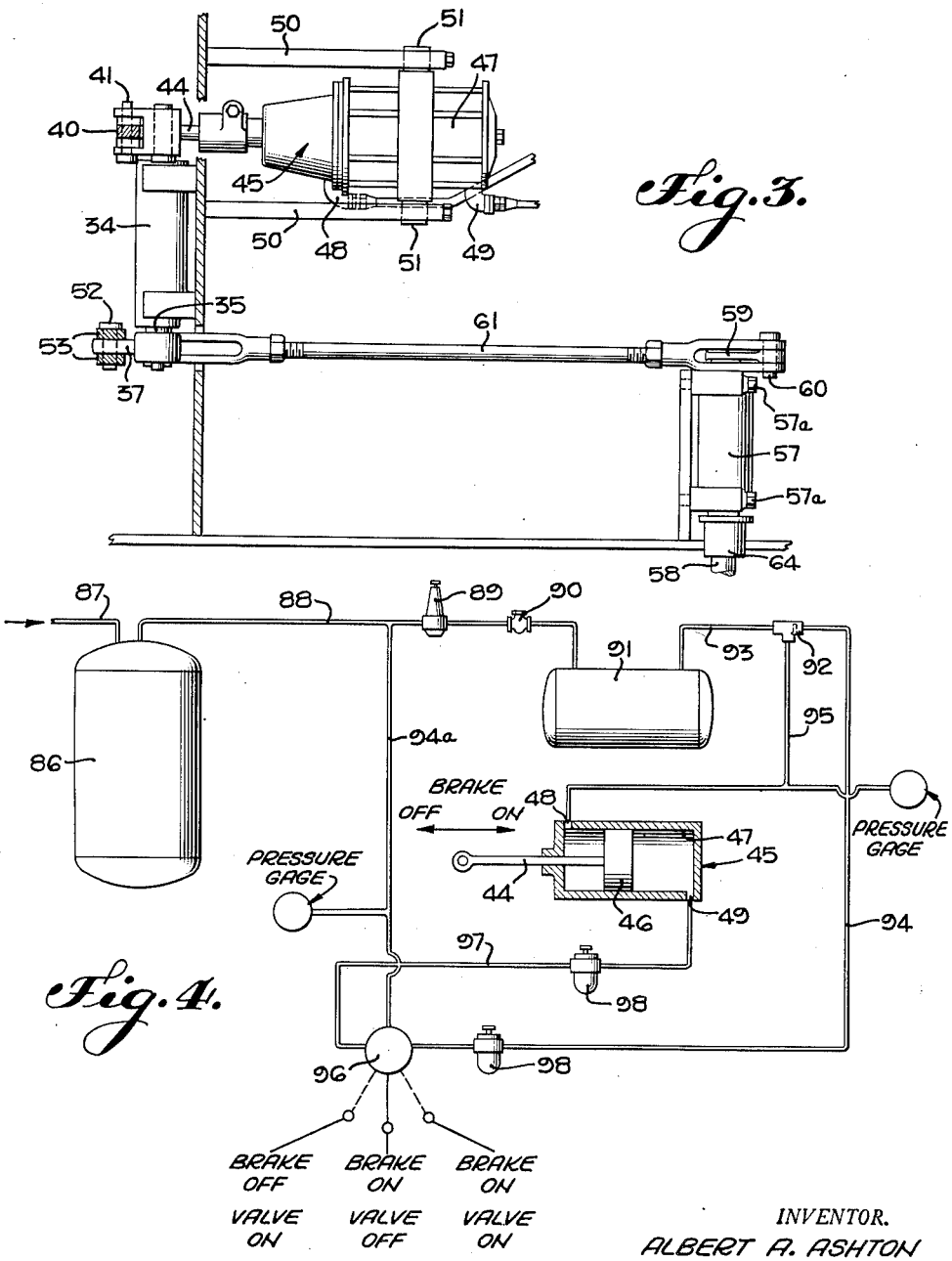

Patented Nov. 10, 1953

2,658,589

UNITED STATES PATENT OFFICE 2,658,589

AIR BRAKE FOR DRAWWORKS

Albert A. Ashton, Houston, Tex., assignor to Emsco Manufacturing Company, Los Angeles, Calif., a corporation of California Application April 7, 1950, Serial No. 154,540

4 Claims. (Cl. 188—151)

The present invention relates generally to heavy duty band brakes of the type utilized in the oil drilling industry for drawworks; and is more particularly concerned with improved actuating means and control therefor.

It is an object of the herein described invention to provide an improved braking mechanism having a brake which is moved toward and away from a brake drum by a fluid cylinder actuator utilizing a fluid such as air under pressure, and which may also be actuated mechanically by means of a hand lever.

A further object of the invention is to provide a simplified equalizing mechanism in a drawworks brake which permits actuation of the brake by either a fluid actuator or mechanically by means of a hand lever, even though one of the brakes fails to operate.

Still another object of the invention is to provide in a braking mechanism fluid actuator means and control, wherein a relatively low fluid pressure is normally utilized to operate the brake elements to braking position, and a higher fluid pressure is utilized for actuating the brake elements to non-braking position, and for augmenting the braking effect in case of emergency, and at such times as the normal low fluid pressure is insufficient to give the required braking effect.

Further objects of the invention will be brought out in the following part of the specification, wherein detailed description is for the purpose of fully disclosing the invention without placing limitations on its scope.

Referring to the drawings, which are for illustrative purposes only:

Fig. 2 is a rear elevational view taken from the position indicated by the arrow 2 of Fig. 1;

Fig. 3 is a fragmentary plan view of the brake actuating mechanism, partly in section, the section being taken substantially on line 3—3 of Fig. 1; and Fig. 4 is a view diagrammatically showing the fluid supply and control for the fluid actuator of the brake.

Figure 1:
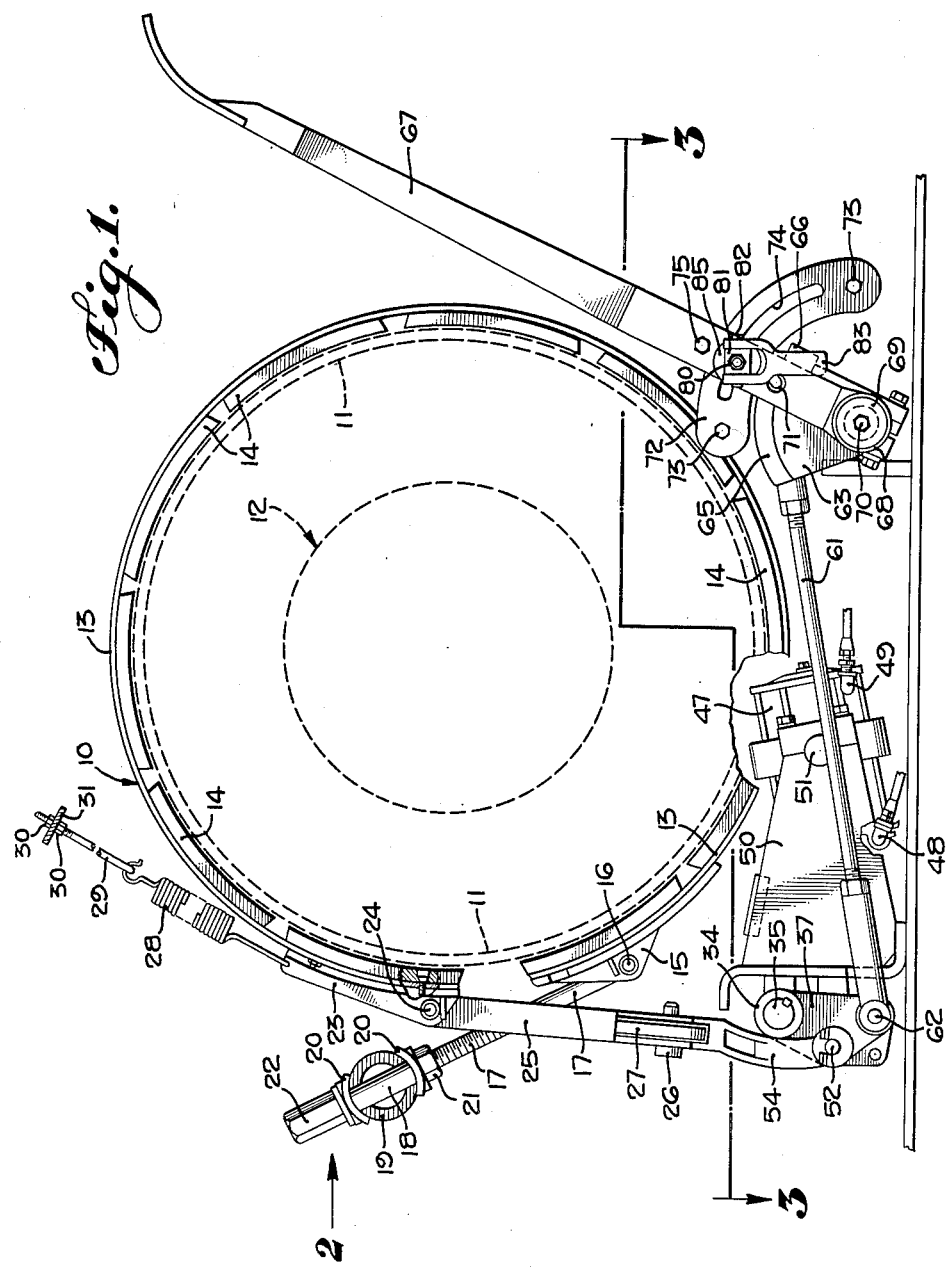
Fig. 1 is a side elevational view of a brake embodying the features of the present invention.

Referring now to the drawings, Figs. 1 and 2 show the brake of the present invention as comprising a set of brake bands 10—10 disposed in spaced relation so as to engage the drums 11—11, respectively, at the ends of a cable spool 12, shown in phantom lines. Each brake band 10 comprises a split ring 13 of spring steel or other suitable material to which brake blocks 14 of suitable friction brake lining material are secured for engagement with the associated drums when the brake bands are constricted or tightened during the braking operation.

One end of each brake band assembly 10 is anchored so as to form a dead end by means of an end bracket 15 which is pivotally connected by a pivot pin 16 with one end of an adjusting rod 17 having its other end threaded. The threaded end of the adjusting rod 17 is fitted with a tubular sleeve 18 which is mounted in diametrically positioned openings in a pipe structural member 19 rigidly supported to form an anchor. On opposite sides of the pipe 19 at the ends of the sleeve 18, the adjusting rod is provided with adapter fittings 20—20 against which clamping nuts 21 and 22 may be tightened to secure the adjusting rod 17 in adjusted position endwise in the structural member 19.

The other end or live end of the brake band assembly is provided with an end bracket 23 which is pivotally connected by a pivot pin 24 with an actuating link 25, the links 25—25 of the two brake band assemblies being connected at their opposite ends by pivot pins 26—26, respectively, to the opposite ends of an equalizer bar 27 by means of which the brake bands are simultaneously operable, and between which the operating forces are equalized.

The brake band assemblies 10 are normally biased toward non-braking or released position by means of a coiled spring 28, in each case, having one end connected to the end bracket 23 and its other to an eye bolt 29 anchored by securing nuts 30—30 in a frame member 31 by a simple adjustment of the eye bolt 29 in the frame member 31, the tension of the spring 28 may be adjusted to vary its opening or releasing action of the brake band. Moreover, the brake bands may be individually adjusted to accommodate any variations which may appear in one brake band and not in the other.

In order that the operating forces will be symmetrically applied to the ends of the brake band assembly, it will be observed that each actuating link 25 is provided with an elongate slot 32 to which the associated adjusting rod 17 is carried, the link 25 and adjusting rod 17 thus being disposed in crossed relation at the rear side of the brake drums.

Supported below and adjacent to the equalizer bar 27 from an adjacent part of the frame structure by means of bolts 33 is a bearing housing 34 within which a shaft 35 is rotatable. The ends of the shaft 35 project from either end of the housing and are respectively provided with angle levers 36 and 37 which are keyed or otherwise fixably secured to the shaft 35 for rotation therewith.

The angle lever 36 is U-shaped having spaced apart legs 38 and 39 between which one end of an equalizer connection clevis 40 is connected by a pivot pin 41, the opposite end of this clevis being pivotally connected by a pivot pin 42 to the adjacent margin of the equalizer bar. In angular relation to the pivot pin 41, and disposed at a greater distance from the center of rotation of the shaft 35, is a second pivot pin 43 which pivotally connects one end of a piston rod 44 of a fluid actuator 45 to the angle lever 36, whereby reciprocable movements of the piston rod act to angularly transmit its movements through the angle lever 36 to the clevis 40 so as to actuate the brake bands to the equalizer bar 27 and actuating links 25—25.

The fluid actuator comprises a piston 46, as schematically represented in Fig. 4, which is reciprocably mounted within an associated cylinder 47, one end of this cylinder having a fluid connection 48 at one end and a fluid connection 49 at its other end. As shown in Fig. 3, the cylinder 47 is positioned between spaced bracket plates 50—50 and is rockingly supported between its ends on trunnions 51—51. The angle lever 37 at the other end of the shaft 35, instead of being U-shaped is of single plate construction and is connected by an inner pivot pin 52 to the straddling bifurcated end 53 of a safety link 54 which is connected by a pivot pin 55 to the equalizer bar 27 at a point spaced from the pivot pin 42 at the center of the equalizer bar 27. As shown, the pivot pin 55 is positioned between pivot pins 42 and 26, being more closely disposed to the pivot pin 26. The pivot pin 55 extends through a slightly elongated opening 56 in the equalizer bar so as to provide a loose connection which will permit a limited angular movement of the equalizer bar 27 about the pivot pin 42. Thus, should restraint be removed from one end of the equalizer bar 27, it may swing on the pivot pin 42 until the pivot pin engages one end of the opening 56. Thereafter, the angle of the equalizer bar cannot change and it will then be bodily moved in response to the swinging of the angle levers 36 and 37 in response to the brake actuating means. With this arrangement, failure of either one of the brakes will not prevent the remaining brake from operating in response to the brake actuating mechanism.

In addition to the fluid actuator for operating the brakes, the brakes are also arranged to be independently operated mechanically. As primarily shown in Figs. 1 and 2, a bearing housing 57 is supported by bolts 57a from an adjacent portion of the frame structure at the front side of the drawworks, this bearing housing serving to rotatably support a shaft 58 therein. One end of this shaft is connected with a lever arm 59 which is pivotally connected at its outer end by means of a pivot pin 60 to one end of the connecting rod 61, the other end of this connecting rod being pivotally connected to an outwardly disposed pivot pin 62 carried by the angle lever 37.

The other end of the shaft 58 is extended beyond the bearing housing 57 and is keyed or otherwise secured to a segmental lever 63, a spacer sleeve 64 being interposed between the segmental lever 63 and the adjacent end of the bearing housing 57. The periphery of the lever 63 at its outer marginal edge is provided with an arcuate shoulder 65, and at one end of this shoulder with an abutment 66 which extends beyond the outer edge or face of the shoulder 65 in the line of movement of a hand lever 67 connected at its inner end to a sleeve 68 which is rotatable on the shaft 58 and retained thereon by an end washer 69 and cap screw 70. Thus, the lever 67 is freely swingable on the shaft, but when swung in a clockwise direction until it strikes the abutment 66 the lever will act to rotate the segmental lever 63 and manually actuate the brake bands toward braking position. Moreover, with the arrangement described, the segmental lever 63 will follow the operation of the brake bands by the fluid actuator.

Should occasion arise where the fluid actuator is unavailable to operate the brake, and it is desired to operate the brake manually from the hand lever 67, provision is made for temporarily connecting the hand lever 67 with the segmental lever 63. For such purpose, the inner end of the hand lever 67 is provided with a threaded opening 71 which registers with a threaded opening in the arcuate cylinder 65 when the lever is against the abutment 66. By inserting a cap screw in these registered openings, the lever 67 may be secured to the segmental lever 65 for operating it in both clockwise and counter-clockwise directions.

When it is desired to maintain the brake in braking position for an extended period of time, the hand lever 67 may be locked in brake-on position by means of a handle lock which will now be described.

In concentric relation to the segmental lever 63, an arcuate plate 72 is supported at its ends as by bolts 73 from an adjacent part of the plane structure, this plate containing an arcuate slot 74. The plate 72 extends alongside the inner end portion of the handle lever 67 and is parallel to the plane of movement of this lever. A cap screw 75 is supported by the lever and extends inwardly over the outer edge and in spaced relation thereto of the arcuate plate 72, the threaded end of the cap screw 75 having a nut 76 threaded thereon which serves as an abutment for a plate 77 slidably supported thereon. An expansion coiled spring 78 surrounding the shank of the cap screw has one end bearing against the adjacent surface of the hand lever 67 and its other end against the plate 77, this spring acting to normally bias the plate away from the hand lever against the abutment nut 76. The other end of the plate 77 has threadedly secured thereto a stud 79 which projects through the slot 74 and an aperture in the hand lever, the outer ends of this stud being provided with adjustable jamb nuts 80. Slidable on the stud 79 on the opposite side of the hand lever 67 from that on which the plate 77 is positioned, is a block 81 as shown in Fig. 1, which has oppositely extending trunnions 82 upon which a handle 83 is swingably supported. The pivoted end of this handle 83 is bifurcated and provided with spaced cam surfaces 84—84 which lie on opposite sides of the studs 79 and are adapted to engage against a washer 85 interposed between the cam surfaces and the adjacent surface of the handle brake 67. With the blocking mechanism in the positions shown in Fig. 2, with the handle 83 depending, the hand lever 67 may be freely swung along the arcuate plate 72 within the limits of slot 74. To block the hand lever 67 against movement, the handle 83 is swung in a counter-clockwise direction, as viewed in Fig. 2, to a raised position which causes the cam surfaces 84 to act in such a manner that the washer 85 and plate 77 are clampingly moved together to bind the hand lever 67 and arcuate plate 72 against relative movement and thus block the hand lever in position.

The handle 83, and associated elements may be used for locking the hand lever 67 in a substantially vertical position of non-use, when desired, in which position the handle is retained out of engagement with the abutment 66 of the segmental lever 63.

From the foregoing description, it is apparent that the brake may be independently actuated by either the fluid actuator 45, or by means of the hand lever 67 or a combination of both.

Control for the fluid actuator is schematically illustrated in Fig. 4, and comprises a primary air supply tank 86 adapted to contain air at a pressure of substantially 125 lbs. per sq. in., which is supplied from any suitable source through a supply connection 87. An outlet connection 88 connects the tank 86 through a pressure regulator 89 and check valve 90 with an auxiliary air tank 91 containing air at substantially 75 lbs. per sq. in., pressure.

A double check valve 92 is connected with one of its inlet connections connected through a connection 93 with the auxiliary air tank 91, and its other inlet connection connected through a connection 94, 94a and 88 with the primary tank 86. The branch connection of the double check valve is connected through a connection 95 with fluid connection 48 of cylinder 47.

The connection 94a leads to a regulating and emergency three-position valve 96 which is adapted to connect the primary tank pressure with connection 94 or a connection 97 connecting with fluid connection 49 of the cylinder 47. Lubricators 98—98 are respectively positioned in the connection lines 94 and 97 for lubricating the interior of the fluid actuator.

Operation of the control for the fluid actuator will now be explained. With the control handle of valve 96 in mid position, as shown in Fig. 4, the valve being off, air at 75 lbs. pressure will be supplied from the tank 91 through the double check valve by connections 93 and 95 to the fluid connection 48 of the cylinder. Whereupon the piston 46 will be moved to the right in a direction which will apply the brakes.

In order to release the brakes, the valve handle is moved to the left to "valve-on" position. This connects the 125 lb. air pressure from tank 86 through connection 94a with connection 97 to fluid connection 49. The air pressure of 125 lbs. on the opposite side of the piston 46 acts against the pressure of 75 lbs. so that the predominating force acting on the piston is such as to move it in a direction toward the left, which is such as to actuate the brake to release for non-braking position.

For emergency operation, when the normal 75 lb. pressure is insufficient to produce the required braking, or when it is desired to augment the braking effect produced by the 75 lb. pressure, the valve control handle is moved to the right of its mid-position. In this position, the 125 lb. fluid pressure in the tank 86 is connected through connection 94a, connection 94, double check valve 92, connection 95 and thence to the fluid connection 48. The higher pressure in the double check valve causes it to cut off the 75 lb. fluid pressure supply from tank 91 so that instead of 75 lb. pressure acting to move the piston in brake-on direction, there is now a pressure of 125 lb. pressure acting to give increased braking effect.

I claim:

1. A brake mechanism for a brake drum, comprising: a brake band operatively associated with said brake drum; a double acting fluid actuator connected to said brake band, operable in brake applying and brake releasing directions; a low pressure fluid source connected to operate said actuator in a brake applying direction; a high pressure fluid source; and control means for selectively connecting said high pressure source to said actuator so as to operate the actuator in said brake applying direction and thereby effect a forceful application of said brake band, or so as to oppose the action of said low pressure fluid and operate the actuator in a brake releasing direction.

2. In a mechanism for applying and releasing a brake: a first fluid pressure operable means connected to said brake and being adapted to exert a force to apply the brake and maintain the same in applied condition; means operable to deliver a brake applying fluid pressure to said first fluid pressure operable means; a second fluid pressure operable means connected to said brake in opposition to said first means; means including a control valve operable to selectively apply fluid pressure to said second fluid pressure operable means of sufficient magnitude to overcome the brake applying action of fluid pressure in said first fluid pressure operable means and effect release of said brake, and to release fluid pressure from said second fluid pressure operable means so that fluid acting in said first means will again apply the brake; and means operable to apply to said first fluid pressure operable means a fluid pressure greater than said brake applying fluid pressure.

3. In a mechanism for applying and releasing a brake: a first fluid pressure operable means connected to said brake and being adapted to exert a force to apply the brake and maintain the same in applied condition; means applying fluid pressure to said first fluid pressure operable means; a second fluid pressure operable means connected to said brake in oposition to said first means; and means including a control valve operable to selectively and alternately apply fluid pressure to said second fluid pressure operable means of sufficient magnitude to overcome the brake applying action of fluid pressure in said first fluid pressure operable means and effect release of said brake, and to apply a fluid pressure to said first fluid pressure operable means to increase the force with which it applies the brake.

4. A drawworks brake mechanism, comprising: a brake having a movable operating member; a double acting fluid pressure operated actuator connected to said operating member of said brake, said actuator having a brake applying pressure fluid inlet and a brake releasing pressure fluid inlet; a main high pressure fluid source; an auxiliary low pressure fluid source; a double check valve having one of its inlets connected to said low pressure source and its outlet connected with said applying pressure fluid inlet of said actuator; and means including a control valve adapted to selectively connect said high pressure source to the other inlet of said check valve and to said brake releasing pressure fluid inlet of said actuator.

ALBERT A. ASHTON.

References Cited in the file of this patent

UNITED STATES PATENTS

| Number | Name | Date |
| --- | --- | --- |
| 705,592 | MacLaughlin | July 29, 1902 |
| 1,311,030 | Wood et al. | July 22, 1919 |
| 1,552,584 | Sumner | Sept. 8, 1925 |
| 1,833,167 | Luzzi | Nov. 24, 1931 |
| 1,987,435 | Engel | Jan. 8, 1935 |
| 2,371,856 | Tremolada | Mar. 20, 1945 |
| 2,371,857 | Stevenson | Mar. 20, 1945 |
| 2,422,370 | Schnell | June 17, 1947 |
| 2,464,469 | Tremolada | Mar. 15, 1949 |

FOREIGN PATENTS

| Number | Country | Date |
| --- | --- | --- |
| 459,433 | Great Britain | Jan. 4, 1937 |